United States Patent
Markham et al.

(10) Patent No.: US 7,491,336 B2
(45) Date of Patent: Feb. 17, 2009

(54) PROCESS FOR TREATING INDUSTRIAL EFFLUENT WATER WITH ACTIVATED MEDIA

(75) Inventors: Gary W. Markham, Manvel, TX (US); Harmon L. Kirkpatrick, Pearland, TX (US); Rick Guercio, Cypress, TX (US); Douglas E. Mast, Pearland, TX (US); Stanley C. Gustas, Jr., Houston, TX (US)

(73) Assignee: Rimkus Consulting Group, Inc., Houston, TX (US)

( * ) Notice: Subject to any disclaimer, the term of this patent is extended or adjusted under 35 U.S.C. 154(b) by 0 days.

(21) Appl. No.: 11/591,146

(22) Filed: Nov. 1, 2006

(65) Prior Publication Data

US 2008/0099404 A1   May 1, 2008

(51) Int. Cl.
C02F 3/00 (2006.01)

(52) U.S. Cl. .............. 210/663; 210/680; 210/665; 210/666; 210/667; 210/693; 210/669

(58) Field of Classification Search ............. 210/663, 210/680, 665–667, 693, 669
See application file for complete search history.

(56) References Cited

U.S. PATENT DOCUMENTS

| | | | |
|---|---|---|---|
| 4,192,371 A | 3/1980 | Derouette et al. | |
| 4,652,376 A | 3/1987 | Kumaoka | |
| 4,824,579 A | 4/1989 | George | |
| 4,863,891 A | 9/1989 | Grasselli | |
| 5,158,678 A | 10/1992 | Broussard, Sr. | |
| 5,376,266 A | 12/1994 | Broussard | |
| 5,407,584 A | 4/1995 | Broussard, Sr. | |
| 5,492,622 A | 2/1996 | Broussard | |
| 5,522,999 A | 6/1996 | Broussard | |
| 5,707,530 A | 1/1998 | Broussard, Jr. | |
| 5,725,764 A | 3/1998 | Broussard, Jr. | |
| 5,942,111 A | 8/1999 | Broussard, Jr. | |
| 5,997,737 A | 12/1999 | Sturdevant et al. | |
| 6,042,763 A | 3/2000 | Kumaoka | |
| 6,337,023 B1 | 1/2002 | Broussard, Sr. et al. | |
| 6,413,432 B1 | 7/2002 | Kumaoka | |
| 6,420,292 B1 | 7/2002 | Kumaoka | |
| 6,432,369 B1 | 8/2002 | Mulvaney et al. | |
| 6,444,124 B1 * | 9/2002 | Onyeche et al. ............. 210/603 |
| 6,878,279 B2 * | 4/2005 | Davis et al. ................. 210/610 |

(Continued)

OTHER PUBLICATIONS

PCT Office, "Notifaction of Transmittal of the International Search Report and the Written Opinion of the Intrnational Searching Authority, or the Declaration," PCT Office, (Apr. 11, 2008).

Primary Examiner—Chester T Barry
(74) Attorney, Agent, or Firm—Gable & Gotwals (57) ABSTRACT

In a process for treating effluent water, a stream of effluent water is fed to a porous ceramic media filled reactor. Organic and inorganic impurities are absorbed and/or oxidized from the effluent water into the media and/or off-gases. The remainder of the effluent water stream is dispensed from the reactor in an outlet stream suitable for direct discharge to the sea or for recycling without incurring the disadvantages of generating a solid sludge. The reactor includes a chamber containing activated media, such as pellets of porous ceramic material. The pellets are stored in a vertical stacks of sub chambers defined by horizontal perforated trays and/or in a horizontal chains of sub chambers defined by vertical perforated baffles.

12 Claims, 9 Drawing Sheets

U.S. PATENT DOCUMENTS

2003/0168410 A1   9/2003  Robicheaux et al.
2005/0061737 A1   3/2005  LInden et al.
2005/0154153 A1   7/2005  Battiste
2007/0179296 A1*  8/2007  Maples et al. ................. 546/13
2007/0297858 A1* 12/2007  Imbrie ................... 405/128.45

* cited by examiner

Fig. 11

PROCESS FOR TREATING INDUSTRIAL EFFLUENT WATER WITH ACTIVATED MEDIA

BACKGROUND OF THE INVENTION

This invention relates generally to waste water treatment and more particularly concerns the treatment of hazardous waste waters such as the effluent water discharged from hydrocarbon processing facilities, general industrial facilities or contaminated municipal water supplies.

The effluent water discharging from a hydrocarbon processing facility contains oil components, phenols, gas components such as $H_2S$ and $NH_3$. Similarly, chemical and industrial processes use water in their operations for cooling, quenching, pH adjustment and washing of various hydrocarbon streams, usually resulting in the creation of an effluent water stream containing inorganic and organic contaminants. Tank farm operations, marine facilities and ships contain effluent water and soil and ground water reservoirs are occasionally contaminated by oil and chemical spills.

The Federal Resource Conservation and Recovery Act (RCRA) of 1976 has focused the attention of both industry and government on the problems of land and water way disposal of untreated hazardous waste from industrial facilities, including hydrocarbon processing facilities and oil and gas operating facilities, and encouraged the development of alternative hazardous waste treatment technologies to immobilize and/or destroy the waste either in situ, in previously disposed waste or at the waste generation site. More recent federal legislation, such as the Comprehensive Environmental Response Compensation and Liability Act (CERCLA) of 1980, encourages the development and adoption of hazardous waste treatment and destruction processes that would eventually eliminate the need for land disposal of hazardous waste including water effluent from hydrocarbon processing facilities, except for the disposal residues from treatment operations. Despite the focused attention on the problems, various studies estimate such hazardous waste is generated by the petroleum refining industry at a rate of more than one million tons per year.

The biological treatment of waste streams is based on the ability of a mixed population of microorganisms to utilize organic contaminants as nutrients. The two major classes of known biological treatments are aerobic with oxygen and anaerobic without oxygen. Because biological systems contain living organisms, they require specific ratios of carbon and nutrients. Most organisms function within a relatively neutral pH range between 6.0 and 8.0. High concentrations of toxic and organic substances such as cyanide, arsenic, and heavy metal ions and solutions such as copper, lead and zinc inhibit enzyme formation in the microorganisms and eventually kill them. Consequently, some waste streams are not treatable by known biological treatment processes.

Wet air oxidation, generally considered to be a pre-treatment process, is used to economically treat aqueous wastes containing both organic and inorganic toxics in waste streams too dilute to incinerate and too toxic to biotreat. The process alters chemical structure by low temperature oxidation of the waste so that toxic compounds become nontoxic. In known wet air oxidation processes, depending on the waste, the off gas may have to be scrubbed or otherwise treated to remove any low molecular weight hydrocarbons present. If an ionic catalyst must be added to the reactor to improve conversion efficiency, a catalyst regenerator must be added to the process. Elevated temperatures ranging from 175-325° C. and residence times ranging from 60-120 minutes are typically required for oxidation of the waste. Most problematic is that process pressure must be maintained between 300-3000 psig to prevent excessive evaporation of liquid. And the typical construction materials appropriate for wet air oxidation reactors are stainless steel, nickel and titanium alloys.

Chemical oxidation has been found to be effective in the treatment of certain industrial and domestic wastewater and is one of the few processes for removing odor, color and various potentially toxic organic substances such as phenolics, pesticides and industrial solvents. It also disinfects tranquil water by killing or inactivating pathogenic microorganisms that may be present. The chemical oxidants employed include chlorine, chlorine dioxide, ozone and hydrogen peroxide. Known chemical oxidation processes involve a relatively high operating cost and the chemicals used are consumed in the process.

It is, therefore, an object of this invention to provide a process and apparatus useful to treat effluent from hydrocarbon processing facilities. It is also an object of this invention to provide a process and apparatus useful to permit the effluent water discharging from a hydrocarbon processing facility to be recycled or reused. A further object of this invention is to provide a process and apparatus useful to permit the effluent water discharging from a hydrocarbon processing facility to be recycled without treatment at a wastewater disposal plant. Still another object of this invention is to provide a process and apparatus useful to treat effluent from a hydrocarbon processing facility at the facility. Another object of this invention is to provide a process and apparatus useful to treat hazardous wastes that have already entered the water table or landfills. Yet another object of this invention is to provide a process and apparatus useful to immobilize and/or destroy previously disposed waste in situ. An additional object of this invention is to provide a process and apparatus useful to reduce the need for land disposal of hazardous waste other than the disposal residues from treatment operations. It is also an object of this invention to provide a process and apparatus useful to treating a wide range of waste streams. A further object of this invention is to provide a process and apparatus characterized by economically feasible pressure, temperature and residence time requirements in hazardous waste treatment applications. And it is an object of this invention is to provide a process and apparatus characterized by optimized rates of chemical and energy consumption in the treatment of hazardous waste.

SUMMARY OF THE INVENTION

In accordance with the invention, a process and apparatus are provided for treating effluent water from oil field and industrial facilities with activated media such as porous ceramics so as to reduce residues requiring disposal from treatment operations sufficiently to allow discharge of the effluent water to the sea directly or to recycle the effluent water for other purposes without incurring the disadvantage of generating a solid sludge.

The process and apparatus for treating effluent water includes use of a primary separator for removing oil components from the effluent water stream, a secondary separator for removing emulsion type oil components from the effluent water stream and a reactor for absorbing and/or oxidizing organic and/or inorganic impurities such as phenols and BTX and MTBE from the effluent water using the activated media. An air supply device is used to mix the effluent water and activated media. In addition, an agitator may be used to physically mix the effluent water and the activated media in the reaction tank. Sieve trays, structured packing, baffles, or other internals may be used in the configuration of the reactor, depending upon the specific application, the nature and composition of the impurities and desired level of contaminant reduction.

In the effluent water treatment process, a stream of effluent water is fed to a reactor filled with porous ceramic media. Organic and inorganic impurities are absorbed from the effluent water into, and/or oxidized by, the porous ceramic media. The remainder of the effluent water stream exits the reactor in an outlet stream. Insoluble oil components may be separated from the effluent water stream prior to feeding the stream to the media filled reactor. Emulsion oil components may also be separated from the effluent water stream prior to feeding the stream to the media filled reactor. The total organic content and the suspended solids content of the feed stream upstream of the reactor may be monitored and the reactor automatically by-passed in response to a determination that either is less than a predetermined standard. The monitored total organic content and the total suspended solids content of the feed stream upstream of the reactor and the reactor feed rate may also be used to automatically calculate the air flow rate and feed stream residence time in the reactor. Flow of the feed stream to the reactor may be automatically terminated in response to a determination that the total organic content or the total suspended solids content of the feed stream upstream of the reactor is greater than a predetermined maximum. The total organic content of the effluent stream downstream of the reactor may be monitored and the effluent stream may be automatically returned to the upstream feed stream in response to determination that the total organic content of the effluent downstream of the reactor is more than a predetermined maximum.

The reactor has a chamber which contains pellets of porous ceramic media. A first inlet port receives the effluent water into the chamber. A second inlet port admits an oxidizing agent into the chamber. A first outlet port discharges air and combustion products from the chamber. A second outlet port discharges the remainder of the effluent water from the chamber. The pellets may be stored in vertical stacks of sub chambers defined by horizontal perforated trays, in a horizontal chain of sub chambers defined by at least one vertical perforated baffle or in a combination of vertical and horizontal sub-chambers.

BRIEF DESCRIPTION OF THE DRAWINGS

Other objects and advantages of the invention will become apparent upon reading the following detailed description and upon reference to the drawings in which.

While the invention will be described in connection with preferred embodiments thereof, it will be understood that it is not intended to limit the invention to those embodiments or to the details of the construction or arrangement of parts or of the process steps illustrated in the accompanying drawings.

DETAILED DESCRIPTION

Figure 10:
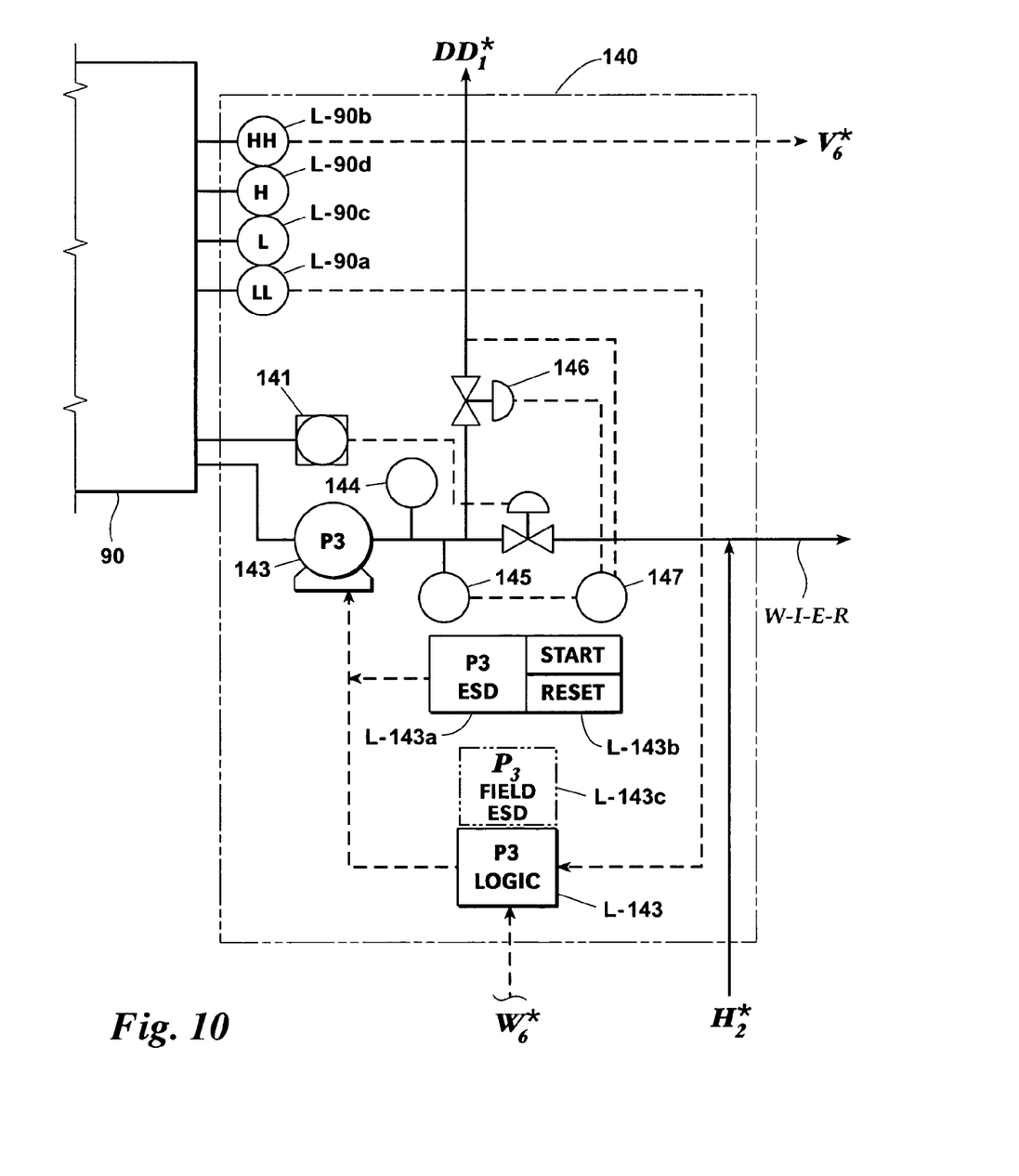
FIG. 10 is a schematic diagram illustrating the post-reactor instruments and controls of the water treatment system.

In the description, some flow lines connect system components which are illustrated in different Figures. Such flow lines have been identified by one or more capital letters with a superscripted asterisk and a subscript number. Each letter with superscripted asterisk indicates a particular flow line. The subscript indicates the other Figure associated with the flow line. For example, looking at FIG. 2, the identifier $H_{10}*$ is used with respect to the flow path from the output of a valve 29. Turning to FIG. 10, as indicated by the subscript in FIG. 2, the identifier $H_2*$ continues the $H*$ flow path to the output of another valve 142. Conversely, continuing to look at FIG. 10, the subscript of the identifier $H_2*$ indicates that the other end of the flow line $H*$ will be found in FIG. 2.

The System

Figure 1:
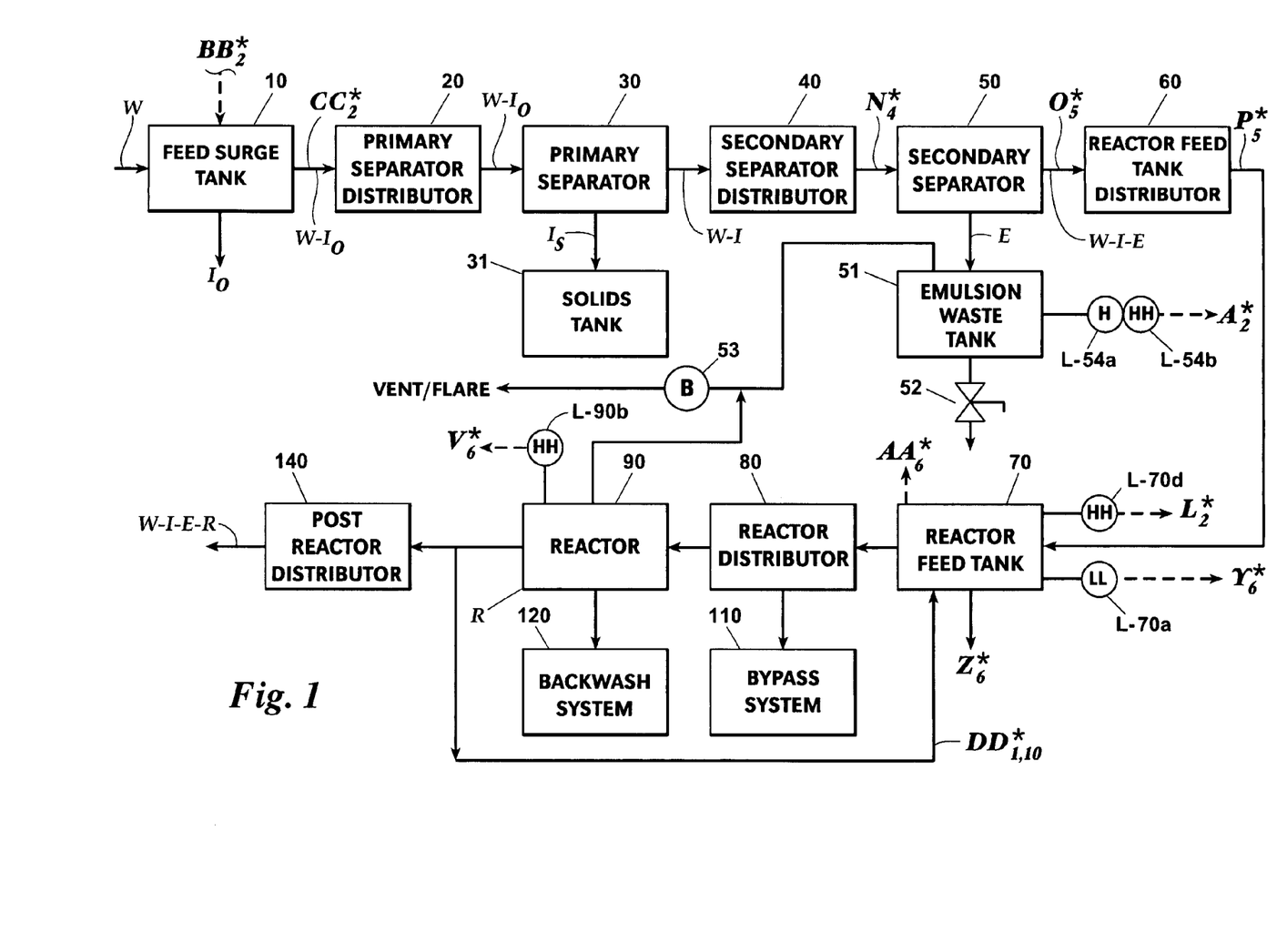
FIG. 1 is a block diagram illustrating the process and apparatus for treating effluent water in accordance with the present invention.

Turning first to FIG. 1, a system for treating effluent water W discharged from oil field and industrial facilities includes a primary separator 30 for removing insoluble oil components and suspended solids I from the effluent water W, a secondary separator 50 for removing emulsion type oil components E from the effluent water W and a reactor 90 filled with porous ceramic media for reacting organic and/or inorganic impurities R such as BTX, phenols, methanol and MTBE from the effluent water W. As hereinafter described, surge tanks, distributors, pumps and recycle lines may be installed between and/or around the primary separator 30, secondary separator 50 and/or the activated media filled reactor 90 to facilitate operation of the system and to handle process upset conditions at the hydrocarbon processing or oil field facility. However, depending on the application, use of the primary separator 30 and/or the secondary separator 50 and related equipment and steps as hereinafter described may be omitted.

The stream of effluent water W discharged from the hydrocarbon processing facility or oil and gas production facility may include insoluble oil components $I_o$ and suspended solids $I_s$ and or emulsion-type oil components E as well as other organic and inorganic impurities R. It may be desirable to remove some or all of the insoluble oil components $I_o$ and suspended solids $I_s$ and/or some or all of the emulsion type components E from the initial stream of effluent water W before removing the impurities R. Insolubles I, in general, are intended to include insoluble oils $I_o$ and insoluble solids $I_s$. Thus, the total stream of effluent water W may be fed to the activated media filled reactor 90 and its associated components, or the total stream of effluent water W less all or some of either or both the insolubles I and emulsions E, that is W–I, W–E or W–I–E, might be fed to the activated media filled reactor 90 and its associated components.

It should not be inferred that the primary separator 30 or the secondary separator 50 must remove all the insolubles I and emulsions E from the initial stream of effluent water W. Nor should it be inferred that the function of the primary separator 30 or the secondary separator 50 must be performed, if at all, by a single primary separator 30 or a single secondary separator 50. The efficiency of the reactor 90 is adversely impacted by the impurities content of the input W–I–E to the reactor 90. It is, therefore, desirable to monitor and control the operation of any primary and secondary separators 30 and 50 in the system and, in extreme conditions, to shut down the operation of the reactor 90 until the W–I–E meets acceptable standards.

Continuing to look at FIG. 1, the equipment in the input stream of effluent water W to the primary separator 30 may include a feed surge tank 10 and a distributor 20. The feed surge tank 10 serves to average the flow of effluent water through the system of separators and reactors and the distributor 20 serves to monitor, control and stabilize the flow of effluent water through the system of separators and reactors. Once fed into the feed surge tank 10, the insoluble oil components $I_o$, having a low specific gravity, migrate to the upper portion of the feed surge tank 10 and are discharged to a slop oil tank (not shown) residing in the user's facility. These components $I_o$ may be reprocessed by the operator of the oil field or hydrocarbon processing facility. As is well known, the efficiency of the separation in the feed surge tank 10 can be enhanced by the installation of filters, inclined plates or baffles in and/or the application of heat to the feed surge tank 10. The remaining water component W–$I_o$, having a high specific gravity, remains in the lower portion of the feed surge tank 10 and is caused to flow under level control to the primary separator 30 by use of pumps as required.

The effluent water less the removed solids W–I exits the primary separator 30 and is fed to the secondary separator 50 through a distributor 40. The distributor 40 monitors, controls and stabilizes the flow. In the secondary separator 50, the effluent water W–I is optimally mixed with naphtha, air, natural gas or other agent to remove the emulsion type oil components E. The removed components E are collected in a waste tank 51 for sale, recycling or use as fuel in heaters or electro-generators.

The effluent water W–I–E discharged from the secondary separator 50 is passed through a reactor feed tank distributor 60, a reactor feed tank 70 and a reactor distributor 80 which are serially installed between the secondary separator 50 and the activated media reactor 90 to prevent the effluent water W–I–E from flowing into the activated media reactor 90 in case of failure by the secondary separator 50 to properly prepare its discharge W–I–E for feeding into the reactor 90, thus protecting the integrity of the activated media. In the reactor 90, other impurities R are removed, resulting in the desired effluent product W–I–E–R.

The distributors 60 and 80 include the instruments and controls associated with the reactor feed tank 70 and the reactor 90. The system may also include a bypass system 110, a backwash system 120 and/or a post-reactor distributor 140 to further protect the reactor 90.

In the following description of the components of the system, logic related primarily to the component described is included in the Figure associated with the component. Logic related to multiple components is further integrated into FIG. 11.

The Primary Separator Feed Surge Tank 10

Figure 2:
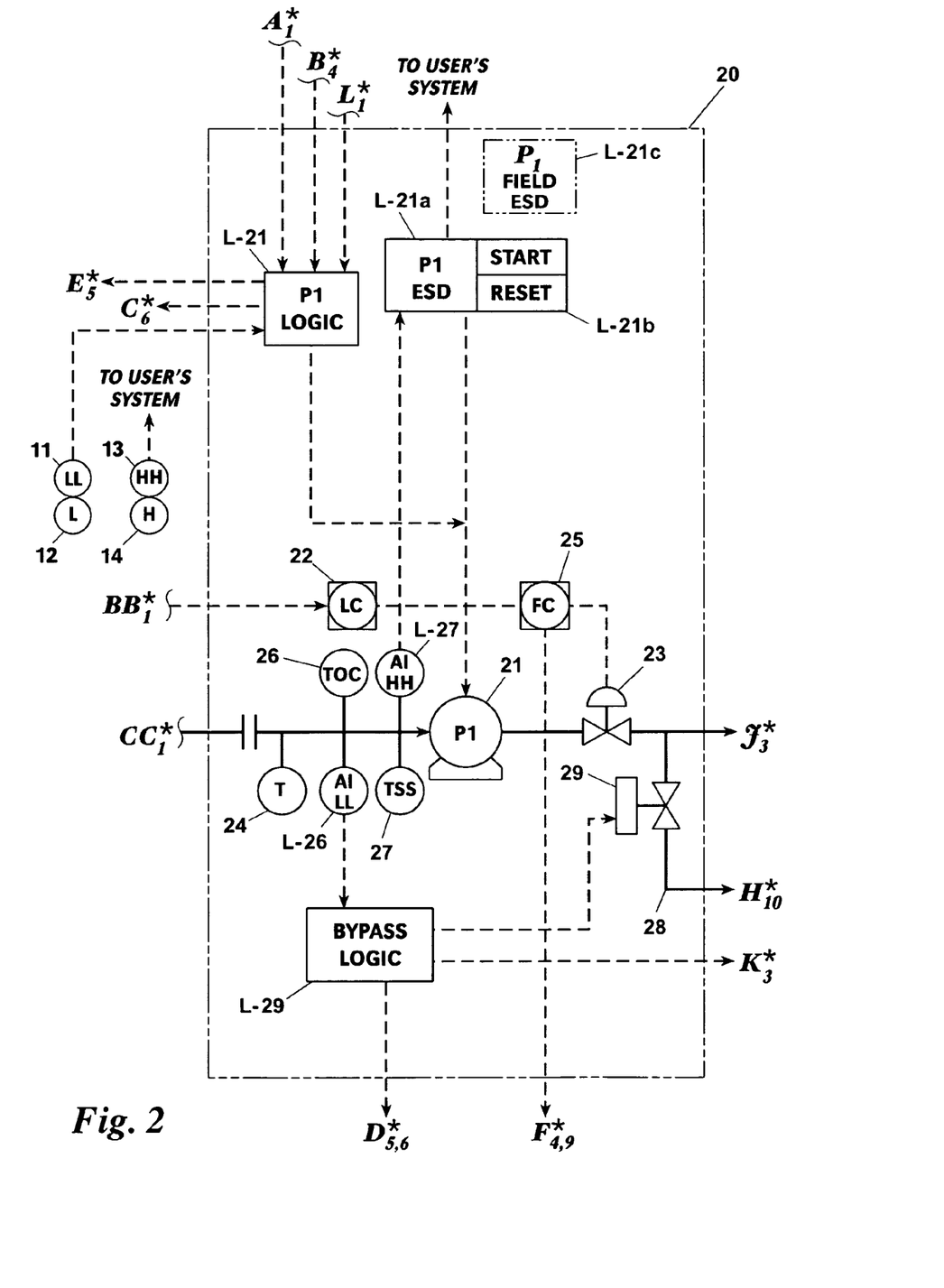
FIG. 2 is a schematic diagram illustrating the instruments and controls associated with the feed surge of the water treatment system.

Looking at FIGS. 1 and 2, the feed surge tank 10 has a low-low level indicator 11 which uses logic L-21 to shut down the feed pump 21, seen in FIG. 2, if the level of the tank 10 is low enough to jeopardize the integrity of the feed pump 21, as would occur if the feed pump 21 were allowed to run dry. The feed surge tank 10 also has low level 12 and high level 14 indicators which serve as alarms to alert the user of abnormal conditions. The feed surge tank 10 also has a high-high level indicator 13 which sends a signal to the user's process control system to indicate that the water treatment process module cannot take more feed for the moment. Waste water flows under the tank overflow baffle. Undissolved oil and organic material $I_o$ float on top of the water and are drained off to the slop oil tank in the user's facility. Some solid material suspended in the plant waste water which enters the feed surge tank 10 may sink to the bottom of the tank 10. A sludge drain permits periodic removal of the collected solids.

The water to be treated in the primary separator 30 flows under the underflow baffle of the feed surge tank 10 to the feed pump 21. The feed surge tank level is controlled by a level controller 22 and a flow valve 23. The temperature of the water exiting the surge tank 10 is measured with a temperature transmitter 24. The level controller 22 is cascaded to a primary flow controller 25 to measure the flow rate of the water exiting the surge tank 10. Where practical, it is preferable to eliminate level controller 22 and have the flow controller 25 retain a user-entered set-point to fix the feed-flow at the maximum rate the module can accept and let the user's process maintain the level of feed surge tank 10. This would maintain a more constant flow through the water treatment module.

The Primary Separator Distributor 20

Figure 3:
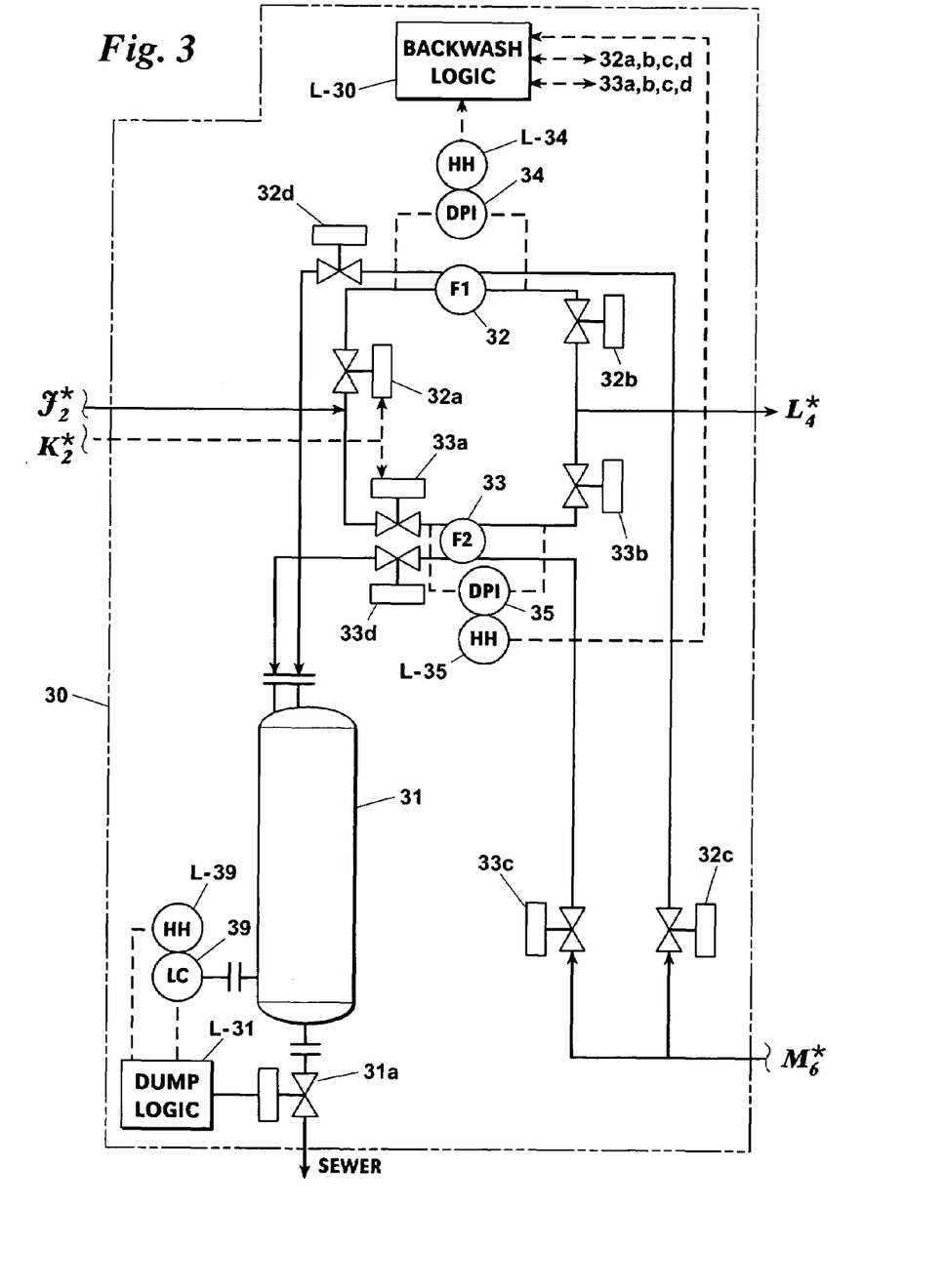
FIG. 3 is a schematic diagram illustrating the instruments and controls associated with the primary separator of the water treatment system.

The primary separator distributor 20, illustrated in greater detail in FIG. 2, includes the instruments and controls associated with the primary separator 30, hereafter described in FIG. 3.

Figure 11:
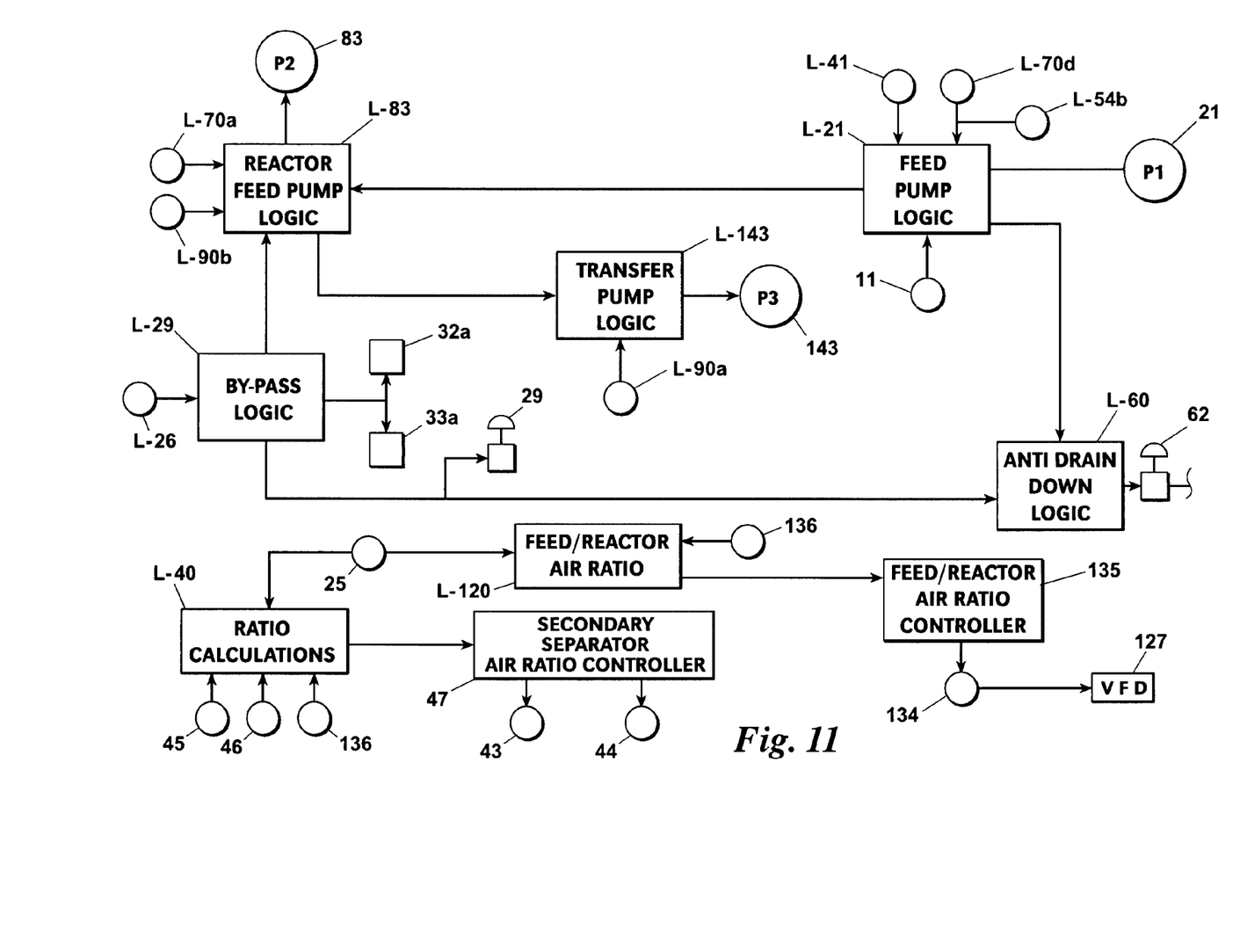
FIG. 11 is a control schematic logic diagram for the water treatment system.

The feed pump 21 supplies the motive force for the effluent stream from the tank 10. Its continued operation is subject to certain conditions and shutdowns hereinafter described. As seen in FIGS. 2 and 11, the feed pump 21 preferably has a control-panel-located emergency shutdown button L-21a, a field-located emergency shut-down button L-21c, and an automatic shutdown controlled by the feed pump logic L-21. Preferably, when the feed pump 21 is shut down by its logic L-21, a reset button L-21b must be pressed before it can be re-started. This allows the user time to investigate the cause of the shutdown and avoids sudden re-starts before causation is established. At the outlet of the feed surge tank 10, a fast-acting analyzer 26 measures the total organic carbon content of the feed stream. An associated indicator L-26 sends a signal to bypass logic L-29 which will bypass the feed stream around the water treatment module whenever the feed stream is clean enough to not need treatment. This is accomplished by opening the bypass valve 29 shown in FIG. 2 and closing the primary separator valves 32a and 33a seen in FIG. 3, shutting down the reactor feed pump 83 seen in FIG. 6 and the treated water transfer pump 143 seen in FIG. 10, and shutting the secondary separator outlet valve 62 seen in FIG. 5. This prevents unnecessary processing of acceptable water and extends the life of the module. The concentration of organics in the water exiting the tank 10, as measured by the organic content analyzer 26 and the feed rate 25 are used to calculate the air flow rate and residence time required for desired dissolved organic reaction in the reactor 90. As previously described, if the concentration of organics in the water exiting the tank 10 meets the requirements of the treated water supply stream 28, the water is directed to the treated water supply stream 28 without further treating by means of a bypass solenoid valve 29. If the concentration of organics in the water exiting the tank 10 does not meet the requirements of the treated water supply stream 28, the water is directed to the primary separator 30. At the outlet of the feed surge tank 10, the analyzer 27 measures the total suspended solids in the feed stream. When feed stream solids exceed a trigger point, an associated indicator L-27 sends a signal to the pump logic L-21 to shut down the feed pump 21 in order not to overwhelm the process with a feed that would plug the inlet filters quickly. An alarm is also sent to the user's process control system indicating that the stream has too many solids to process through the water treatment module.

The Primary Separator 30

Looking at FIG. 3, the effluent water less the skimmed hydrocarbons enters the primary separator 30, which may consist of a set of in-line parallel filters 32 and 33. The purpose of the primary separator 30 is to remove solids and/or sediment in the feed stream which, above a pre-specified limit, could damage reactor components and cause undesirable opacity in the product stream.

The filters 32 and 33 normally operate with one filter in-line with the feed stream and one held in readiness after undergoing a backwash cycle. A switch of filters and subsequent backwashing of the newly off-line filter is triggered by the in-line filter pressure drop reaching a pre-determined threshold. The backwash logic module L-30 coordinates the flushing of solids from the selected filter via eight valves 32a, b, c, d and 33 a, b, c, d into a receiver tank 31. The tank 31, via a valve 31a, dumps a solid-laden clean effluent periodically to maintain its level between predetermined values. The pressure drop across the filters 32 and 33 is measured by gauges 34 and 35, respectively, and if the pressure drop on either of the filters 32 or 33 reaches a trigger value, associated alarms L-34 and L-35 will send a signal to the filter backwash logic L-30 which then isolates and performs backwash operations on the appropriate filter 32 or 33 and sets it in a "ready" status for the next high-high filter pressure drop condition. At any given time, the backwash logic L-30 is responsible for the position of the inlet valves 32a and 33a, except when the bypass logic block L-29 is holding the filter inlet valves 32a and 33a closed. Backwash of the filters 32 or 33 is performed by opening either one pair of solenoid valves 33c and 33d for one filter 33 or another pair of solenoid valves 32c and 32d for the other filter 32. A slop oil tank 31 receives the backwash from the filters 32 and 33. As the contents of this tank 31 are high in solids, a ball valve 31a is opened whenever the indicator L-39 associated with a level controller 39 sends a high-high signal to the dump logic L-31. This allows the sediment-laden effluent to "blow through" the ball valve 31a instead of plugging it.

The Secondary Separator Distributor 40

Figures 4, 5, 6:
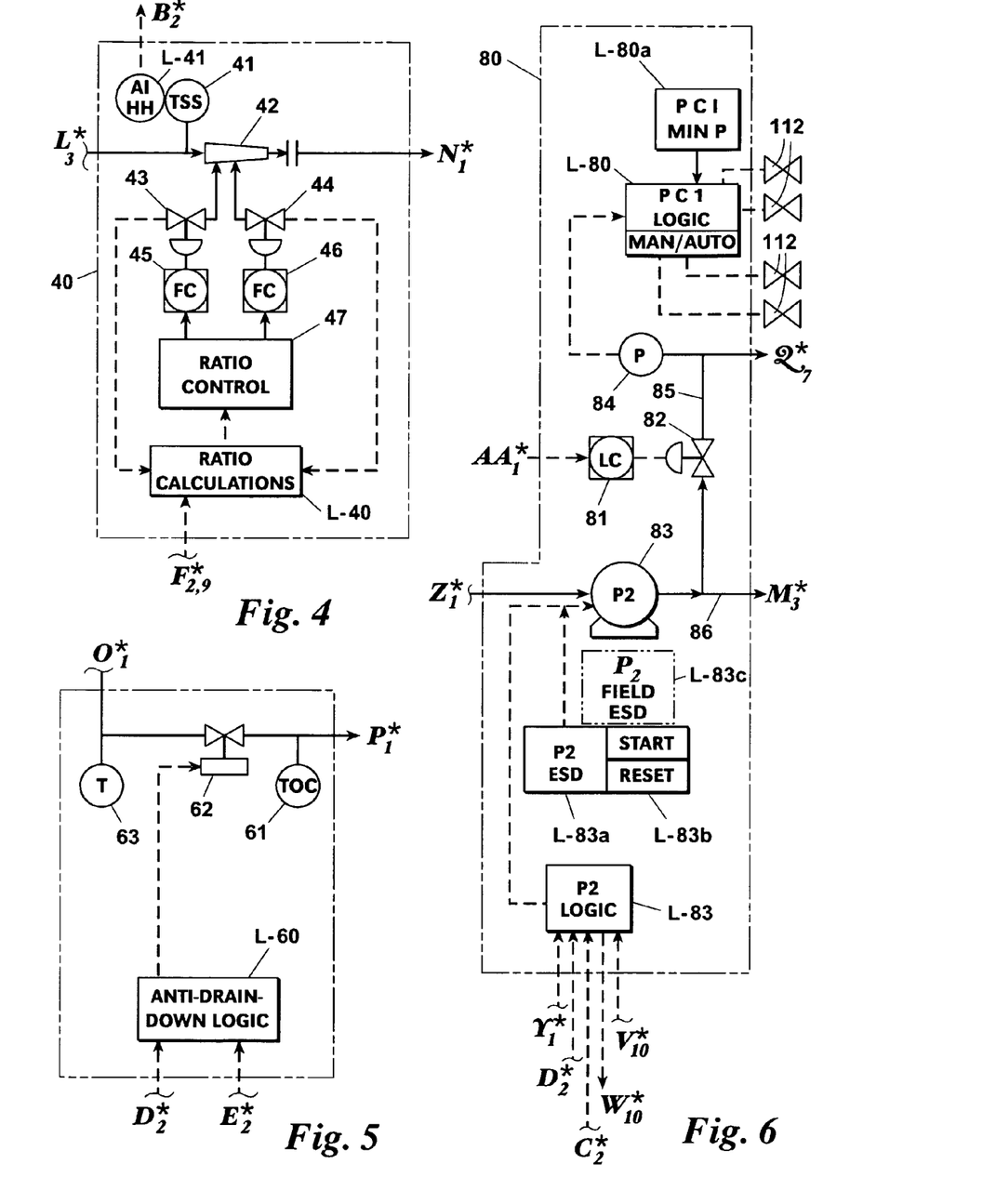
FIG. 4 is a schematic diagram illustrating the instruments and controls associated with the secondary separator of the water treatment system.
FIG. 5 is a schematic diagram illustrating the first of two sets of instruments and controls associated with the reactor of the water treatment system.
FIG. 6 is a schematic diagram illustrating the second of two sets of instruments and controls associated with the reactor of the water treatment system.
Figure 9:
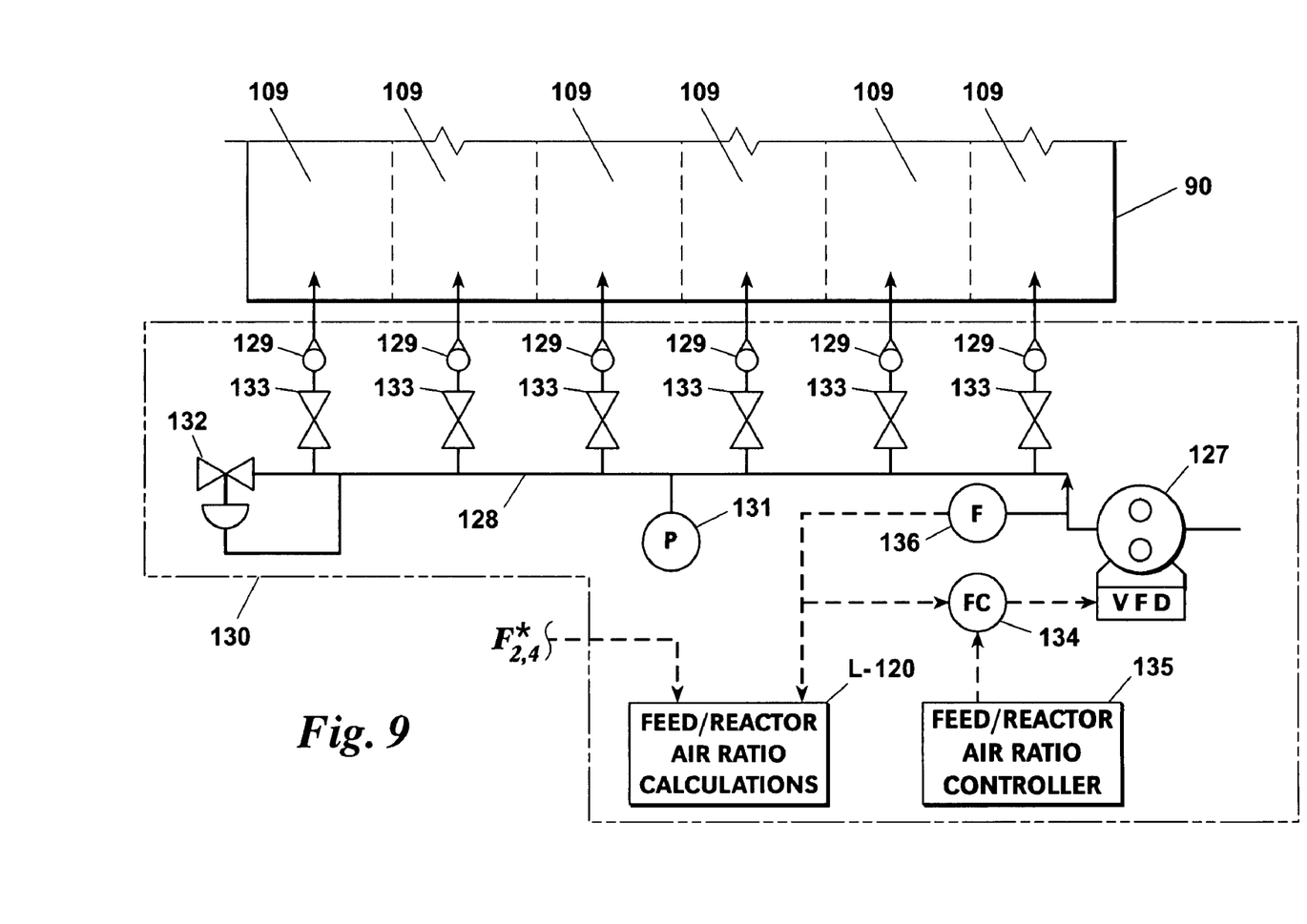
FIG. 9 is a schematic diagram illustrating an embodiment of the air flow system of the reactor.

The secondary separator distributor 40, illustrated in greater detail in FIG. 4, includes the instruments and controls associated with the secondary separator 50. The concentration of total suspended solids in the water exiting the primary separator 30 is measured with a total suspended solids analyzer 41 before being passed to a venturi tube 42. The analyzer 41 is located just downstream of the separator 30. When a total suspended solids trigger value is reached, its associated indicator L-41 sends a signal to the feed pump logic L-21, seen in FIGS. 2 and 11, which will shut down the feed pump 21 in order not to send solids to the downstream reactor 90, whose activated media 91 would be deactivated or plugged by the solids. The air to the venturi 42 is regulated by ratio control through flow valves 43 and 44. Flow controllers 45 and 46 receive remote set-points from a ratio controller 47 which holds the total air going into the venturi 42 at a constant ratio with the process feed rate at the flow controller 25 in the primary separator distributor 20 as seen in FIG. 2. The ratio calculation logic L-40 calculates the sum of flows measured by the flow controllers 45 and 46 for use as the air input measurement of the ratio controller 47, calculates the ratio of air to feed for the ratio controller 47, splits the output of the ratio controller 47 equally to the flow controllers 45 and 46 and calculates the ratio of reactor air to feed for the feed/reactor air ratio logic L-120 as seen in FIG. 9. As shown, the user enters the ratio set-point directly into the controller 47. However, it is likely that this will become a remote set-point if the ratio has a direct effect on the total organic content measured by an analyzer 61 in the secondary separator effluent as hereinafter seen in FIG. 5. The well-mixed water and air enters the secondary separator 50, which is envisioned as a floatation cell, hydroclone or similar device.

The Secondary Separator 50

In the likelihood that the secondary separator 50 contains an upper layer of hydrocarbon emulsion under normal operation, it is desirable not to allow this emulsion to drain down into the reactor feed surge tank 70, seen in FIG. 1, and subsequently contaminate the activated media in the reactor 90. Therefore, the secondary separator 50 works in conjunction with an emulsion waste tank 51. The emulsion layer normally will overflow into the emulsion waste tank 51. The level of the emulsion waste tank 51 is monitored by a level indicator 54. One indicator L-54a sends an alarm to the operator when the level reaches a preset high value and another indicator L-54b, seen in FIG. 11, sends a shutdown signal to the feed pump logic L-21 at a preset trigger high-high level to prevent overflow of this material into the reactor vent system, which is boosted by an exhaust blower 53, as seen in FIG. 1. A manual drain valve 52 may be opened periodically by the user to drain the emulsion waste tank 51. This loop can be automated.

The Reactor Feed Tank Distributor 60

When flow stops to the secondary separator 50 for any reason, the emulsion layer will flow by gravity into the reactor feed tank 70 unless the drain valve 62 from the secondary separator 50 is closed. As seen in FIGS. 5 and 11, anti-drain-down logic L-60 of the feed surge tank distributor 60 monitors all conditions which may result in a drain-down of the secondary separator 50. This includes all conditions in which the feed pump 21 has been shut down, among others. The emulsion exits the secondary separator 50 and is collected in the emulsion waste tank 51, as seen in FIG. 1. Air and vapors are directed to a vent or a flare or ingested in a gas engine or fired heater. The water W–I–E exits the secondary separator 50 and the total organic content of the water is measured with a total organic content analyzer 61, as seen in FIG. 5. If the total organic content of the water W–I–E exceeds a predetermined set point, typically 1,000 parts per million, the solenoid valve 62 immediately closes, to prevent drain-down and to protect the reactor 90 from fouling. The exact value varies according to the demands of the specific application. The bottoms outlet temperature of the secondary separator 50 is measured by a temperature transmitter 63 and this information is used to optimize the control of the reactor 90. The water W–I–E is directed from the distributor 60 to the reactor feed tank 70.

The Reactor Distributor 80

The distributor 80 to the reactor 90 is illustrated in greater detail in FIG. 6. The reactor feed tank 70 receives the bottoms effluent from the secondary separator 50 and serves as the feed surge tank for the reactor 90. Its bottoms level controller 81 controls the effluent rate from the feed tank 70 which is the feed to the reactor 90. As seen in FIG. 11, the feed tank 70 has a low-low indicator L-70a which works with the reactor feed pump logic L-83 to shut down the reactor feed pump 83 if the level of the reactor feed tank 70 is low enough to jeopardize the integrity of the feed pump 83 which would occur if the pump 83 were allowed to run dry. Looking at FIG. 1, the reactor feed tank 70 also has low level and high level indicators L-70b and L-70c, respectively, which serve as alarms to alert the user to abnormal conditions. Returning to FIG. 11, the reactor feed tank 70 has a high-high level indicator L-70d which sends a signal to the primary separator feed pump logic L-21 shown in FIG. 2 to shut down the primary separator feed pump 21 and also sends a message to the user's process control system that the water treatment process module cannot take more feed for the moment. As seen in FIG. 6, the reactor feed pump 83 supplies the motive force for the demulsified water from the reactor feed tank 70 which supplies both reactor feed 85 and backwash source 86 streams. Its continued operation is subject to certain conditions and shutdowns described above. The reactor feed pump 83 has a control-panel-located emergency shut-down button L-83a, a field-located emergency shut-down button L-83c and an automatic shut-down controlled by the feed pump logic L-83. When the reactor feed pump 83 is shut down by its logic L-83, a reset button L-83b must be pressed before it can be restarted. This allows the user time to investigate the cause of the shutdown and avoids sudden restarts before causation is established.

Figure 7:
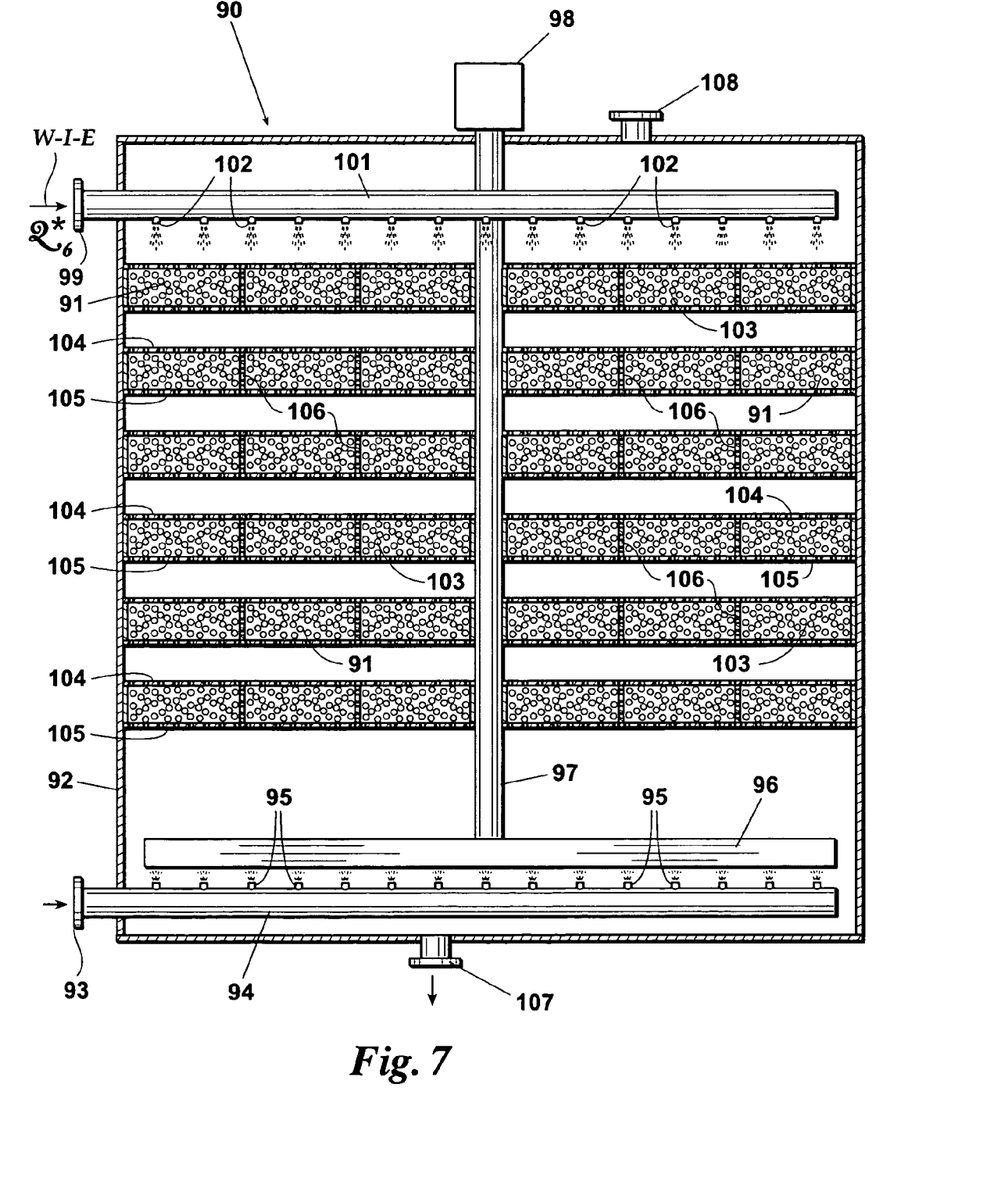
FIG. 7 is a cross-sectional view illustrating an embodiment of the media filled reactor.
Figure 8:
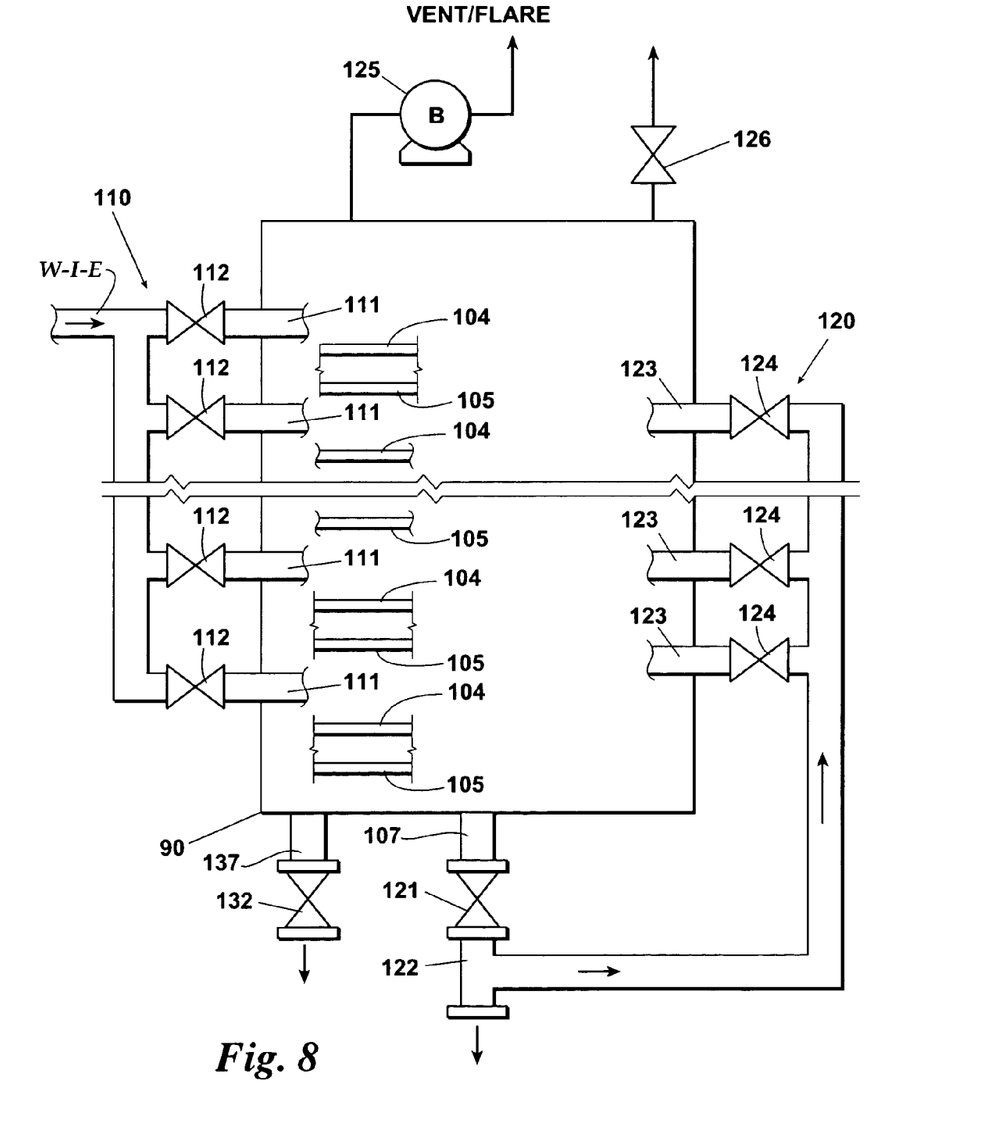
FIG. 8 is a schematic diagram illustrating embodiments of a by-pass system, a backflush system and an exhaust blower system for use with reactor.

Looking at FIGS. 6-8, a pressure transmitter 84 measures the pressure in the distribution nozzles 102 of the reactor 90. This pressure is a function of the flow rate out of the reactor feed tank 70, which is controlled by the level controller 81, the pressure boost supplied by the reactor feed pump 83 and the number of nozzles 102 open to the reactor inlet flow. The control system allows input of a minimum acceptable pressure L-80a and opens or closes successive banks of nozzles 102 to maintain this value. This is accomplished by the user setting a minimum pressure L-80a as a set-point to the distributor pressure control logic L-80. The logic L-80 will open more nozzles 102 using solenoid valves 112 as long as the pressure remains at or above the minimum pressure set-point. As the pressure at the pressure transmitter 84 starts to drop below the minimum pressure, banks of nozzles 102 are closed successively until the pressure stabilizes once again at or above the minimum pressure. To prevent excessive cycling of the valves 112, small dead-bands are integrated into the controller. Associated distributor logic allows the system to operate in manual mode so that the user can have individual access to each of the valves 112 if necessary.

The Reactor 90

Looking at FIG. 7, an embodiment of the porous ceramic media reactor 90 is illustrated. The activated media 91 in the reaction tank 92 of the reactor 90 reacts with the effluent water W–I–E, particularly with the remaining organic and/or inorganic impurities R such as phenols, BTX, methanol and MTBE in the reactor 90. The activated media 91 used in the present invention has a particle size of 0.5 to 4 centimeters and is preferably introduced into the reaction tank 92 of the reactor 90 in pellet form. An air supply system, hereinafter described, mixes the effluent water W–I–E with the porous ceramic media 91 by injecting air into the reaction tank 92 through an air inlet 93 to a header 94 with an array of air distribution nozzles 95 at the bottom of the reaction tank 92. The nozzles 95 upwardly disperse the air uniformly throughout the reaction tank 92. An agitator 96 may optionally be included in the reactor 90 to assist in mixing the effluent water W–I–E with the porous ceramic media 91 in the reaction tank 92. The agitator 96 rotates above the array of nozzles 95 on a shaft 97, preferably driven by an electric motor 98 typically in a range of up to approximately 180 rpm. The effluent water W–I–E is introduced via a water inlet 99 to a distribution header 101 and an array of water distribution nozzles 102 at the top of the reaction tank 92. The nozzles 102 downwardly dispense the water uniformly across the area of the reaction tank 92. The media 91 is contained in compartments 103 in the reaction tank 92. The compartments 103 are formed by upper and lower horizontal perforated plates 104 and 105 spaced along the height of the reaction tank 92 and vertical perforated baffles 106 spaced between pairs of the horizontal plates 104 and 105. The pairs of upper and lower horizontal plates 104 and 105 form trays of media 91 spaced apart in the tank 92. The compartments 103 insure uniform distribution of the media 91 in the tank 92 and reduce the likelihood of migration of the media 91 in the tank 92 as the media 91 disintegrates into finer pieces. The treated water exits the reaction tank 92 through an outlet 107 at the bottom of the tank 92 and the gaseous waste exits the tank 92 through an outlet 108 at the top of the tank 92.

The tank 92, plates 104 and 105 and baffles 106 may be of any suitable material including galvanized steel, stainless steel, aluminum, plastic or steel. However, plastics may not be suitable for some organic materials and steel may deteriorate. The perforations are preferably punched or drilled holes of diameter suitable to retain the porous ceramic media 91 evenly distributed in the plates 104 and 105 and baffles 106. The agitator 96 is preferably stainless steel. The tank 92 may be rectangular or cylindrical, the former being preferred for ease of manufacture. The residence time of the water W–I–E in the reactor tank 92 is preferably about 30 minutes, but can vary from 5 minutes to 24 hours, depending upon the application. Multiple reactors installed in series or parallel may be required in certain applications.

Bypass and Backwash Systems 110 and 120

Turning now to FIG. 8, the reactor 90 may be equipped with a bypass system 110 and/or backwash system 120. In the by-pass system 110, multiple inlet water headers 111 are each controlled by a separate solenoid valve 112 to introduce flow W–I–E between selected beds of media 91 formed by the upper and lower plates 104 and 105. Thus, beds fouled by oil or debris can be by-passed. In the backwash system 120, the reactor water outlet 107 has a block valve 121 with a T-joint 122 connecting the clean water from the reactor 90 to multiple clean water headers 123 each controlled by a separate solenoid valve 124. This permits introduction of clean water or a cleaning solution into the reactor 90 to clean selected individual beds of media. As also seen in FIG. 8, the reactor 90 may be optionally equipped with an exhaust blower 125 for those applications where the vent system has a high pressure drop. The reactor 90 is also equipped with a combination pressure and vacuum safety valve 126 which protects the reactor 90 from over or under pressure. As seen in FIG. 8, the sludge drain block valve 132 in the reactor 90 facilitates the removal of sludge and media fines. The bottom of the reactor 90 is sloped toward a low point drain outlet connection 137.

External Reactor Air Injector System 130

Looking at FIG. 9, one of several possible ways to direct air into the reactor 90 is illustrated. A positive displacement blower 127, optionally equipped with a motor with variable frequency drive to control air flow rate if required, forces air into an external air header 128 relative to the reactor 90 and through multiple rotameters 129, which continuously monitor the air flow rate into the reactor 90. As an alternative to the rotameters 129, orifice plates having pre-specified diameters sized to equalize pressure and therefore airflow into the individual chambers may be used. As shown, the reactor 90 is divided into vertical cells 109 consisting of stacks of beds of media contained in compartments 103 as seen in FIG. 7. A pressure transmitter 131 and a local blowoff valve 132 are used to prevent over-pressuring the inlet air header 128 or the rotameters 129. As shown, the flow to the rotameters 129 may be controlled by separate solenoid valves 133 so as to most efficiently use the cells 109.

The Post-Reactor Distributor 140

The distributor 140 consisting of the post-reactor instrumentation and controls is illustrated in greater detail in FIG. 10. The water level in the reactor 90 is maintained by a level controller 141 and a level control valve 142. A treated water transfer pump 143 draws suction from the bottom of the reactor 90. The temperature is monitored with a temperature transmitter 144 and the total organic content is monitored with a total organic content analyzer 145. If the total organic content of the water pumped out of the reactor 90 fails to meet the requirements of the treated water system, a flow valve 146 is opened to direct the flow to the reactor feed tank 70. The recycle flow rate to the reactor feed tank 70 is continuously monitored by a flow transmitter 147. For long-term, substantial recycle flows, a feedback loop to the process inlet will be implemented to reduce feed to the system.

Protective Logic of the System

Turning now to FIG. 11, the field instrumentation, connective wiring, control valves, computer, distributed control system DCS and human-machine interface HMI, collectively hereinafter referred to as the control system, for automatically controlling, safeguarding and monitoring the water treatment process using instrumentation and computer-driven electronics is illustrated. The control system monitors the purity of the inlet stream and modifies process conditions and flows online so that the outlet stream meets required treated effluent specifications. The DCS interfaces the field instrumentation with a database upon which various control algorithms are applied. This database also interfaces with the HMI so that operators can monitor operations, change setpoints, maintain the equipment, and initiate manual shutdowns at their discretion. The HMI consists of a keyboard and video monitor attached to the DCS computer. It features a graphical representation of the process and graphical icons which serve as monitors and controllers for the various process parameters. A physical control panel adjacent to the DCS and HMI has manual override switches for various control requirements.

As described in relation to FIGS. 1-10, the process is modular and very flexible, facilitating operation on a wide range of feed qualities and quantities. The process and apparatus illustrated in FIG. 11 represents an operational scenario highlighting the functionality of the automated control system.

The reactor 90 receives the bottoms effluent from the reactor feed tank 70. The final reaction occurs in the reactor 90 through a combination of the correct conditions and residence time. As seen in FIG. 10, the bottoms level controller 141 controls the net effluent rate from the reactor 90, which is the process module product. The temperature transmitter 144 measures the temperature of the direct reactor effluent. A low-low level indicator L-90$a$ works with the logic L-143 of the treated water transfer pump 143 to shut down the transfer pump 143 if the tank level of the reactor 90 is low enough to jeopardize the integrity of the transfer pump 143, which would occur if the pump 143 were allowed to run dry. Low level and high level indicators L-90$c$ and L-90$d$, respectively, serve as alarms to alert the user to abnormal conditions. A high-high level indicator L-90$b$ sends a signal to the reactor feed pump logic L-143 to shut down the recycle flow valve 146 and also sends a message to the user's process control system that the water treatment process module cannot take more feed for the moment. The transfer pump 143 supplies the motive force for the effluent from the reactor 90, which comprises both the net reactor treated effluent and the recycle stream. Its continued operation is subject to certain conditions and shutdowns described above. The transfer pump 143 has a control-panel-located emergency shutdown button L-143$a$, a field-located emergency shut-down button L-143$c$ and an automatic shutdown controlled by the feed pump logic L-143. When the transfer pump 143 is shut down by its logic L-143, a reset button L-143$b$ must be pressed before it can be restarted. This allows the user time to investigate the cause of the shut-down and avoids sudden re-starts before causation is established.

Looking at FIG. 9, the positive displacement blower 127 introduces air as an oxidant to the reactor beds. The reactor 90 is the tertiary and final separation section of the module. A flow controller 134 receives an air flow signal from a flow transmitter 136 and remote set-point from ratio controller 135 which holds the total air going into the reactor 90 at a constant ratio with the process feed rate measured by the flow controller 25 seen in FIG. 2. The ratio calculation logic L-120, seen in FIG. 9, calculates the ratio of reactor air to feed for the feed/reactor air ratio controller 135. While the user may enter the ratio set-point directly into the controller 135, this can be remotely set if it can be determined that the ratio has a direct effect on the total organic content reading of the analyzer 145 on the direct effluent from the reactor 90, as seen in FIG. 10. The pressure of the air to the reactor beds is measured by the pressure transmitter 131. Fixed orifices may be used rather than flow valves in order to automatically flow-balance the system and the air nozzle banks may be constructed to correspond to the reactor feed nozzle banks and be shut down in parallel with the same minimum pressure nozzle bank outputs of the reactor feed pressure controller L-80.

Returning to FIG. 10, the reactor treated effluent recycle loop is controlled by the flow controller 147 which receives a cascaded remote set-point from the total organic content analyzer/controller 145 for the treated effluent. Should the total organic content of the reactor treated effluent exceed the maximum acceptable value, the controller 145 will attempt to bring the value down by recycling reactor effluent to the reactor feed tank 70. It is expected that the additional reaction exposure and residence time will reduce the total organic content to specified levels. Should the recycle prove excessive, such that the level in the reactor 90 cannot be controlled, a signal is sent to the user's process control system indicating that the water treatment module cannot continue successful operation at the current feed rate. Alternatively, if the system front end is being operated on a flow basis rather than level control basis, this same signal would instead be sent to alert the user that the feed rate needs to be lowered, or that process problems are arising. The signal can also be used in a constraint control configuration where the feed flow rate is manipulated gradually to the point that the net reactor effluent is just meeting minimum product standards. This would automatically optimize throughput while maintaining operability.

In summary of the system logic, if one or both of the total organic content and total suspended solids are too high to process, inlet flow to the reactor is terminated. If both are very low and meet effluent specifications, the treatment process is bypassed. If the total suspended solids are creating high filter dP, a warning is sounded to initiate a backwash and filter swap. If the total suspended solids after filtration are high, flow to the system is terminated to avoid plugging. The total organic content at the reactor inlet is measured for calculations which determine the optimum amount of air to inject at the bottom of the reactor. The total organic content at the reactor outlet is measured for monitoring purposes only. If the total organic content measured at the reactor outlet is slightly high, a warning that the reactor is not working properly should be sounded. If it is very high reactor effluent can be recycled back to the reactor feed tank.

The Process

Thus, looking again at FIG. 1, the process of treating effluent water W from a hydrocarbon processing facility comprises the steps of removing free oil components $I_o$ from the effluent water W in feed surge/settling tank 10, filtering solids $I_s$ out in a primary separator 30, removing emulsion type oil components E using naphtha or natural gas or air in a secondary separator 50 and reacting the remaining effluent stream with porous ceramic media in the reaction tank 92 of the reactor 90 to remove organic and/or inorganic impurities R such as phenols and other hydrocarbons. The process also utilizes supplemental equipment, instrumentation and controls such as described in relation to the various tanks 10, 31, 51 and 70 and distributors 20, 40, 60, 80 and 140 to monitor, control and, if necessary, bypass or terminate flow of water to be treated by the separators 30 and 50 and the reactor 90, as well as flow of other materials to facilitate efficient operation of the system and particularly the reactor 90.

It is, therefore, apparent that there has been provided, in accordance with the invention, a process and apparatus for treatment of effluent water that fully satisfies the objects, aims and advantages set forth above. While the invention has been described in conjunction with specific embodiments thereof, it will be evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For treating effluent water, a process comprising the steps of:
    feeding a stream of effluent water to a reactor filled with porous ceramic media;
    absorbing organic and inorganic impurities from the effluent water into the porous ceramic media; and
    dispensing a remainder of the effluent water stream from the reactor in an outlet stream.

2. For treating effluent water, a process comprising the steps of:
    feeding a stream of effluent water to a reactor filled with porous ceramic media;
    removing organic and inorganic impurities from the effluent water into the porous ceramic media;
    dispensing a remainder of the effluent water stream from the reactor in an outlet stream; and
    separating insoluble oil components from the effluent water stream prior to feeding the stream to the porous ceramic media filled reactor.

3. For treating effluent water, a process comprising the steps of:
    separating emulsion oil components from the effluent water stream to provide a secondary effluent water stream;
    feeding the secondary stream of effluent water to a reactor filled with porous ceramic media;
    removing organic and inorganic impurities from the effluent water into the porous ceramic media; and
    dispensing a remainder of the effluent water stream from the reactor in an outlet stream.

4. A process according to claim 3 further comprising the step of separating insoluble oil components from the effluent water stream prior to separating the emulsion oil components from the effluent water stream.

5. A process according to claim 3, the reactor being filled with ceramic.

6. For treating effluent water, a process comprising the steps of:
    feeding a stream of effluent water to a reactor filled with porous ceramic media;
    removing organic and inorganic impurities from the effluent water into the porous ceramic media;
    dispensing a remainder of the effluent water stream from the reactor in an outlet stream;
    monitoring a total organic content of the feed stream upstream of the reactor; and
    automatically by-passing the reactor in response to a determination that the total organic content of the feed stream upstream of the reactor is less than a predetermined standard.

7. For treating effluent water, a process comprising the steps of:
    feeding a stream of effluent water to a reactor filled with porous ceramic media;
    removing organic and inorganic impurities from the effluent water into the porous ceramic media;
    dispensing a remainder of the effluent water stream from the reactor in an outlet stream;
    monitoring a total suspended solids content of the feed stream upstream of the reactor; and
    automatically by-passing the reactor in response to a determination that the total suspended solids content of the feed stream upstream of the reactor exceeds a predetermined maximum.

8. For treating effluent water, a process comprising the steps of:
- feeding a stream of effluent water to a reactor filled with porous ceramic media;
- removing organic and inorganic impurities from the effluent water into the porous ceramic media;
- dispensing a remainder of the effluent water stream from the reactor in an outlet stream;
- monitoring a total organic content of the feed stream upstream of the reactor;
- monitoring a total suspended solids content of the feed stream upstream of the reactor; and
- automatically by-passing the reactor in response to one of a determination that the total organic content and the total suspended solids content of the feed stream upstream of the reactor is less than a predetermined standard.

9. For treating effluent water, a process comprising the steps of:
- feeding a stream of effluent water to a reactor filled with porous ceramic media;
- removing organic and inorganic impurities from the effluent water into the porous ceramic media;
- dispensing a remainder of the effluent water stream from the reactor in an outlet stream;
- monitoring a total organic content of the feed stream upstream of the reactor;
- monitoring a total suspended solids content of the feed stream upstream of the reactor; and
- automatically calculating, using the monitored total organic content and the total feed stream flow rate upstream of the reactor, an optimal air flow rate and feed stream residence time in the reactor.

10. For treating effluent water, a process comprising the steps of:
- feeding a stream of effluent water to a reactor filled with porous ceramic media;
- removing organic and inorganic impurities from the effluent water into the porous ceramic media;
- dispensing a remainder of the effluent water stream from the reactor in an outlet stream;
- monitoring a total organic content of the feed stream upstream of the reactor; and
- automatically terminating flow of the feed stream to the reactor in response to a determination that the total organic content of the feed stream upstream of the reactor is greater than a predetermined maximum.

11. For treating effluent water, a process comprising the steps of:
- feeding a stream of effluent water to a reactor filled with porous ceramic media;
- removing organic and inorganic impurities from the effluent water into the porous ceramic media;
- dispensing a remainder of the effluent water stream from the reactor in an outlet stream;
- monitoring a total suspended solids content of the feed stream upstream of the reactor; and
- automatically terminating flow of the feed stream to the reactor in response to a determination that the total suspended solids content of the feed stream upstream of the reactor is greater than a predetermined maximum.

12. For treating effluent water, a process comprising the steps of:
- feeding a stream of effluent water to a reactor filled with porous ceramic media;
- removing organic and inorganic impurities from the effluent water into the porous ceramic media;
- dispensing a remainder of the effluent water stream from the reactor in an outlet stream;
- monitoring a total organic content of the feed stream upstream of the reactor;
- monitoring a total suspended solids content of the feed stream upstream of the reactor; and
- automatically terminating flow of the feed stream to the reactor in response to a determination of one of the total organic content and the total suspended solids content of the feed stream upstream of the reactor as being greater than its respective predetermined maximum.

\* \* \* \* \*